(12) United States Patent
Son et al.

(10) Patent No.: US 11,965,668 B2
(45) Date of Patent: Apr. 23, 2024

(54) DEVICE FOR MANAGING TEMPERATURE

(71) Applicant: KYUNGDONG NAVIEN CO., LTD., Pyeongtaek-si (KR)

(72) Inventors: Seung Kil Son, Seoul (KR); Chang Heoi Heo, Seoul (KR); Nam Soo Do, Seoul (KR); Jung Keom Kim, Seoul (KR)

(73) Assignee: Kyungdong Navien Co., Ltd., Pyeongtaek-si (KR)

(*) Notice: Subject to any disclaimer, the term of this patent is extended or adjusted under 35 U.S.C. 154(b) by 86 days.

(21) Appl. No.: 17/555,685

(22) Filed: Dec. 20, 2021

(65) Prior Publication Data

US 2022/0196279 A1    Jun. 23, 2022

(30) Foreign Application Priority Data

Dec. 22, 2020  (KR) .................. 10-2020-0181322
Apr. 2, 2021   (KR) .................. 10-2021-0043520
Dec. 10, 2021  (KR) .................. 10-2021-0176970

(51) Int. Cl.
  *F24F 11/86*   (2018.01)
  *F24F 11/77*   (2018.01)
  *F24F 11/873*  (2018.01)
  *F24F 110/10*  (2018.01)

(52) U.S. Cl.
  CPC .............. *F24F 11/86* (2018.01); *F24F 11/77* (2018.01); *F24F 11/873* (2018.01); *F24F 2110/10* (2018.01)

(58) Field of Classification Search
  CPC .......... F24F 11/86; F24F 11/77; F24F 11/873; F24F 2110/10
  See application file for complete search history.

(56) References Cited

U.S. PATENT DOCUMENTS

2017/0292728 A1* 10/2017 Ushirosako .............. F24F 11/86

FOREIGN PATENT DOCUMENTS

JP    2009210217 A  *  9/2009
WO    WO-2015151294 A1 * 10/2015 ............ F24F 1/0007

OTHER PUBLICATIONS

Kilicarslan, Ali, A comparative study of water as a refrigerant with some current refrigerants, Jul. 18, 2005,International Journal of Energy Research, Int.J.EnergyRes.2005;29:947-959 DOI:10.1002/er.1084 (Year: 2005).*

* cited by examiner

*Primary Examiner* — Edelmira Bosques
*Assistant Examiner* — Michael James Giordano
(74) *Attorney, Agent, or Firm* — ALG Intellectual Property, LLC

(57) ABSTRACT

A device for managing a temperature according to an embodiment of the present disclosure includes a conversion controller that estimates an indoor set temperature based on a temperature of air returned from a target zone and an operating time of a state converter, and controls a state conversion amount of the state converter by comparing the estimated indoor set temperature with the temperature of the returned air, and a heat exchanger for varying the temperature of the returned air and providing the air whose temperature is varied to the target zone.

17 Claims, 9 Drawing Sheets

DEVICE FOR MANAGING TEMPERATURE

CROSS-REFERENCE TO RELATED APPLICATIONS

This application claims the benefit of priority to Korean Patent Application No. 10-2020-0181322, 10-2021-0043520 and 10-2021-0176970, filed in the Korean Intellectual Property Office on Dec. 22, 2020, Apr. 2, 2021 and Dec. 10, 2021, respectively, the entire contents of which are incorporated herein by reference.

TECHNICAL FIELD

The present disclosure relates to a temperature management device capable of controlling an indoor temperature with warm air or cold air.

BACKGROUND

When using a general air conditioner, an indoor temperature is able to become lower than a set temperature even when an operation of the air conditioner is stopped as the indoor temperature reaches the set temperature during a cooling operation, and the indoor temperature is already higher than the set temperature even when the cooling operation starts as the indoor temperature becomes higher than the set temperature while the cooling operation is stopped.

In addition, because a general warm air heater is constructed to supply air heated with a maximum heat amount to an interior at a maximum wind speed during operation as there is no concept of indoor set temperature, even when the operation is stopped, the indoor temperature may rise continuously for a while.

The general warm air heater or the air conditioner has to maintain the indoor temperature at the set temperature, but the indoor temperature becomes higher or lower than the set temperature.

SUMMARY

The present disclosure has been made to solve the above-mentioned problems occurring in the prior art while advantages achieved by the prior art are maintained intact.

An aspect of the present disclosure provides a temperature management device for estimating an indoor temperature set by a user, and maintaining the indoor temperature based on the estimated indoor temperature.

Another aspect of the present disclosure provides a warm air heater using a temperature management device that may estimate an indoor temperature set by a user and vary a heat amount and a wind volume based on the estimated indoor temperature.

Another aspect of the present disclosure provides an air conditioner using a temperature management device that may estimate an indoor temperature set by a user and vary a refrigerant compression capacity and a wind volume of an air conditioner outdoor unit based on the estimated indoor temperature.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a device for managing a temperature includes a conversion controller that estimates an indoor set temperature based on a temperature of air returned from a target zone and an operating time of a state converter, and controls a state conversion amount of the state converter by comparing the estimated indoor set temperature with the temperature of the returned air, and a heat exchanger for varying the temperature of the returned air and providing the air whose temperature is varied to the target zone.

In one implementation, the state converter may convert a state of a specific material with the state conversion amount resulted from the control of the conversion controller, and provide the converted specific material to the heat exchanger.

In one implementation, the conversion controller may vary the state conversion amount by comparing the temperature of the returned air with the estimated indoor set temperature.

In one implementation, when the heat exchanger increases the temperature of the returned air and provides the air whose temperature is increased to the target zone, the conversion controller may heat the specific material by increasing the state conversion amount of the state converter when the temperature of the returned air is lower than the estimated indoor set temperature, and heat the specific material by decreasing the state conversion amount of the state converter when the temperature of the returned air is higher than the estimated indoor set temperature.

In one implementation, when the heat exchanger decreases the temperature of the returned air and provides the air whose temperature is decreased to the target zone, the conversion controller may increase a pressure of the specific material by increasing the state conversion amount of the state converter when the temperature of the returned air is higher than the estimated indoor set temperature, and decrease the pressure of the specific material by decreasing the state conversion amount of the state converter when the temperature of the returned air is lower than the estimated indoor set temperature.

In one implementation, the conversion controller may store the temperature of the returned air when the state converter stops operating, and estimate an average of stored air temperatures within an allowable error range as the estimated indoor set temperature.

In one implementation, the state converter may include a heater, the conversion controller may include a heat amount controller, the state conversion amount may include a heat amount, and the heater may heat water with the heat amount resulted from control of the heat amount controller, and provide the heated water to the heat exchanger.

In one implementation, the heat amount controller may increase the heat amount of the heater when the temperature of the returned air is lower than the estimated indoor set temperature, and decrease the heat amount of the heater when the temperature of the returned air is higher than the estimated indoor set temperature.

In one implementation, the heat amount controller may decrease the heat amount of the heater to a minimum heat amount of the heater when the temperature of the returned air is higher than the estimated indoor set temperature to reduce the heat amount of the heater, and control the heater to heat the water with the minimum heat amount until the heater stops operating.

In one implementation, the device may further include a blower for transferring the heated air to the target zone and retrieving the air from the target zone, a wind volume of the blower may be increased when the temperature of the returned air is lower than the estimated indoor set temperature, and the wind volume of the blower may be decreased when the temperature of the returned air is higher than the estimated indoor set temperature.

In one implementation, the heat amount controller may store the temperature of the returned air when the heater stops operating, and estimate an average of stored air temperatures within an allowable error range as the estimated indoor set temperature.

In one implementation, the heat amount controller may increase the estimated indoor set temperature when an operating time of the heater increases to be greater than a reference time.

In one implementation, the heat amount controller may update the estimated indoor set temperature when the estimated indoor set temperature exceeds an allowable error range, and maintain the estimated indoor set temperature when the estimated indoor set temperature is within the allowable error range.

In one implementation, the state converter may include an air conditioner outdoor unit, the conversion controller may include a compression controller, the state conversion amount may include a compression capacity, and the air conditioner outdoor unit may compress a refrigerant with the compression capacity resulted from control of the compression controller and provide the compressed refrigerant to the heat exchanger.

In one implementation, the compression controller may increase the compression capacity of the air conditioner outdoor unit when the temperature of the returned air is higher than the estimated indoor set temperature, and decrease the compression capacity of the air conditioner outdoor unit when the temperature of the returned air is lower than the estimated indoor set temperature.

In one implementation, the compression controller may decrease the compression capacity of the air conditioner outdoor unit to a minimum compression capacity of the air conditioner outdoor unit when the temperature of the returned air is lower than the estimated indoor set temperature to reduce the compression capacity of the air conditioner outdoor unit, and control the air conditioner outdoor unit to compress the refrigerant with the minimum compression amount until the air conditioner outdoor unit stops operating.

In one implementation, the device may further include a blower for transferring the air cooled by the heat exchanger to the target zone and retrieving the air from the target zone, the blower may increase a wind volume when the temperature of the returned air is higher than the estimated indoor set temperature, and the blower may decrease the wind volume when the temperature of the returned air is lower than the estimated indoor set temperature.

In one implementation, the compression controller may store the temperature of the returned air when the air conditioner outdoor unit stops operating, and estimate an average of stored air temperatures within an allowable error range as the estimated indoor set temperature.

In one implementation, the compression controller may decrease the estimated indoor set temperature when an operating time of the air conditioner outdoor unit increases to be greater than a reference time.

In one implementation, the compression controller may update the estimated indoor set temperature when the estimated indoor set temperature exceeds an allowable error range, and maintain the estimated indoor set temperature when the estimated indoor set temperature is within the allowable error range.

According to another aspect of the present disclosure, a warm air heater using a temperature management device includes an indoor temperature regulator for creating a heating request signal by comparing a current indoor temperature with an indoor set temperature, a water heater for heating water during an enabled section of the heating request signal and providing the heated water to a heat exchanger, and a heat amount controller that controls a heat amount of the water heater based on a temperature of air returned from an interior receiving heated air from the heat exchanger and the heating request signal.

In one implementation, the water heater may heat the water with a heat amount resulted from the control of the heat amount controller and provide the heated water to the heat exchanger.

In one implementation, the heat amount controller may store the temperature of the returned air temperature when the heating request signal is disabled, and estimate an indoor set temperature of the indoor temperature regulator by calculating an average of stored air temperatures.

In one implementation, the heat amount controller may increase the heat amount of the water heater when the temperature of the returned air is lower than the estimated indoor set temperature, and decrease the heat amount of the water heater when the temperature of the returned air is higher than the estimated indoor set temperature.

In one implementation, the heat amount controller may decrease the heat amount of the water heater to a minimum heat amount of the water heater when decreasing the heat amount of the water heater as the temperature of the returned air is higher than the estimated indoor set temperature, and control the water heater to heat the water with the minimum heat amount until the heating request signal is disabled.

In one implementation, the heat amount controller may increase the estimated indoor set temperature when the enabled section of the heating request signal becomes greater than a preset section.

According to another aspect of the present disclosure, an air conditioner using a temperature management device includes an indoor temperature regulator for creating a cooling request signal by comparing a current indoor temperature with an indoor set temperature, an air conditioner outdoor unit that compresses a refrigerant during an enabled section of the cooling request signal and provides the compressed refrigerant to a heat exchanger, and a compression controller that controls a refrigerant compression capacity of the air conditioner outdoor unit based on a temperature of air returned from an interior receiving cooled air from the heat exchanger and the cooling request signal.

In one implementation, the air conditioner outdoor unit may compress the refrigerant by an amount corresponding to the refrigerant compression capacity resulted from the control of the compression controller and provide the compressed refrigerant to the heat exchanger.

In one implementation, the compression controller may store the temperature of the returned air temperature when the cooling request signal is disabled, and estimate an indoor set temperature of the indoor temperature regulator by calculating an average of stored air temperatures.

In one implementation, the compression controller may increase the refrigerant compression capacity of the air conditioner outdoor unit when the temperature of the returned air is higher than the estimated indoor set temperature, and decrease the refrigerant compression capacity of the air conditioner outdoor unit when the temperature of the returned air is lower than the estimated indoor set temperature.

In one implementation, the compression controller may decrease the refrigerant compression capacity of the air conditioner outdoor unit to a minimum refrigerant compression capacity of the air conditioner outdoor unit when decreasing the refrigerant compression capacity of the air conditioner outdoor unit as the temperature of the returned air is lower than the estimated indoor set temperature, and control the air conditioner outdoor unit to compress the refrigerant with the minimum refrigerant compression capacity until the cooling request signal is disabled.

In one implementation, the compression controller may decrease the estimated indoor set temperature when the enabled section of the cooling request signal becomes greater than a preset section.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
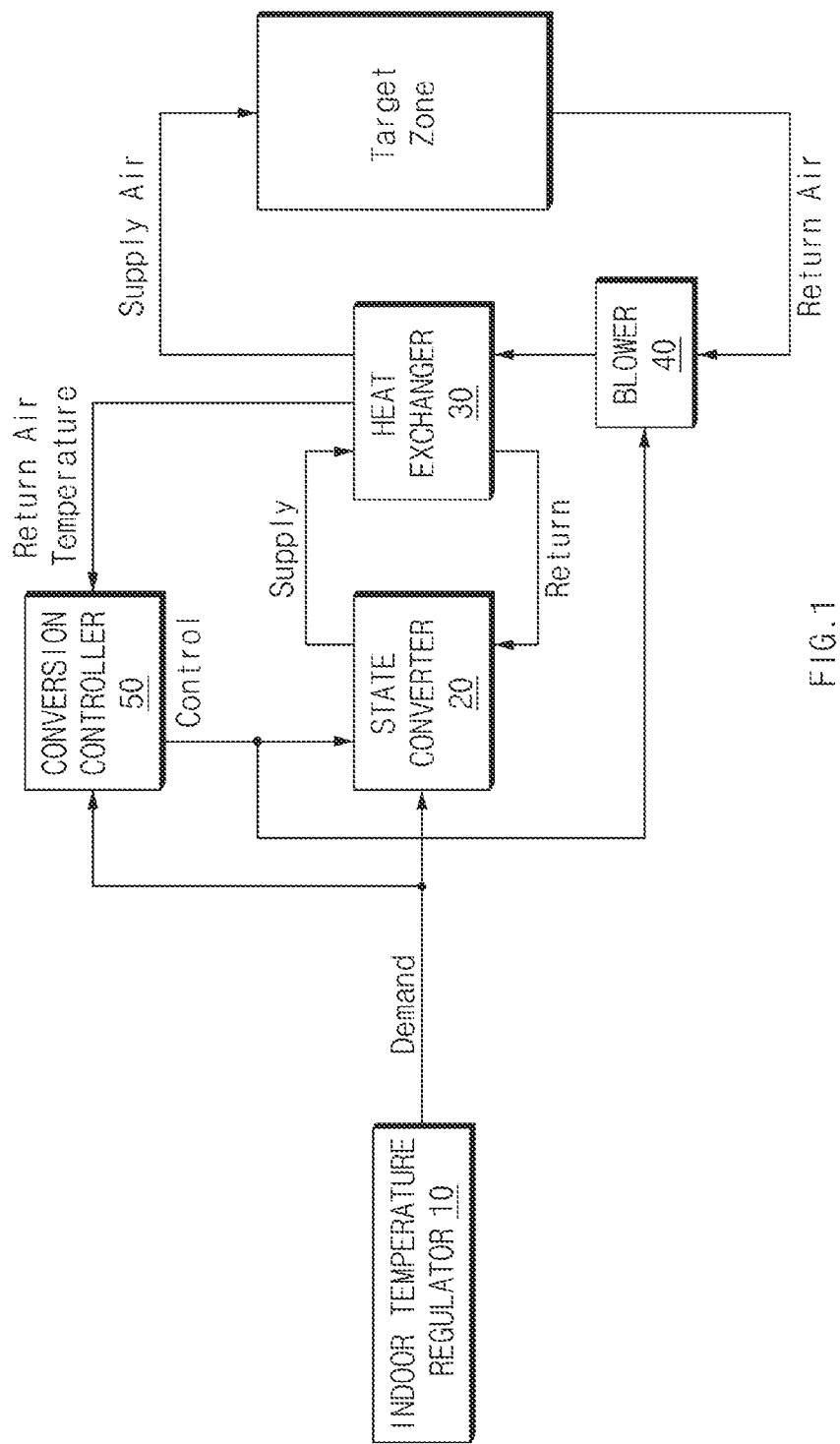
FIG. 1 is a diagram showing a configuration of a temperature management device according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in detail with reference to FIGS. 1 to 9.

FIG. 1 is a diagram showing a configuration of a temperature management device according to an embodiment of the present disclosure.

Referring to FIG. 1, a temperature management device according to an embodiment of the present disclosure may include an indoor temperature regulator 10, a state converter 20, a heat exchanger 30, a blower 40, and a conversion controller 50.

The temperature management device according to an embodiment of the present disclosure may supply cold air or warm air (Supply Air) to a target zone. For example, the target zone may be an interior of a building. In addition, the temperature management device according to an embodiment of the present disclosure may convert air introduced from the target zone into the cold air or the warm air and supply the cold air or the warm air to the target zone.

The indoor temperature regulator 10 may set a temperature of the target zone, that is, an indoor temperature, in response to an input of a user, and may create a request signal (Demand) by comparing the indoor temperature set by the user with a current indoor temperature.

For example, the indoor temperature regulator 10 may create a request signal (Demand) having a voltage level equal to or higher than a specific voltage level or a voltage level below the specific voltage level by comparing the current indoor temperature with the indoor temperature set by the user.

The request signal (Demand) created by the indoor temperature regulator 10 may be as follows when being described using a digital level as an example.

The indoor temperature regulator 10 may create the request signal (Demand) to be enabled or disabled by comparing the current indoor temperature with the indoor temperature set by the user.

In this connection, the request signal (Demand) created from the indoor temperature regulator 10 may be provided to the state converter 20 and the conversion controller 50.

The state converter 20 may convert a state of a specific material and supply (Supply) the specific material whose state is converted to the heat exchanger 30, and may receive (Return) the specific material whose state is converted again from the heat exchanger 30.

In this connection, the state converter 20 may vary a temperature or a pressure of the specific material and provide the specific material whose temperature or pressure is varied to the heat exchanger 30 when receiving the enabled request signal (Demand) from the indoor temperature regulator 10, and stop the state conversion operation when receiving the disabled request signal (Demand).

In addition, the state converter 20 may vary a state conversion amount of the specific material based on control information (Control) provided from the conversion controller 50.

For example, the state converter 20 may heat the specific material with a heat amount based on the control information (Control) when the temperature of the specific material is increased.

In addition, the state converter 20 may compress the specific material with a compression capacity based on the control information (Control) when the pressure of the specific material is increased.

The heat exchanger 30 may increase or decrease a temperature of air using the specific material whose state is converted provided from the state converter 20, and supply the air whose temperature is increased or decreased (Supply Air) to the target zone.

In this connection, the heat exchanger 30 may increase or decrease the temperature of the air (Return Air) provided from the blower 40, and may sense the temperature of the air (Return Air) provided from the blower 40 and provide a sensed result (Return Air Temperature) to the conversion controller 50.

The blower 40 may suck the air of the target zone, and pass the sucked air through the heat exchanger 30 to be introduced into the target zone.

In this connection, the blower 40 may receive the control information (Control) from the conversion controller 50, may operate at a higher wind speed as the state conversion amount of the state converter 20 increases, and may operate at a lower wind speed as the state conversion amount of the state converter 20 decreases.

The conversion controller 50 may create the control information (Control) based on an air temperature (Return Air Temperature) at a time when the state converter 20 stops the state conversion operation of the specific material and an operating time of the state converter 20.

For example, the conversion controller 50 may create the control information (Control) for controlling the state conversion amount of the state converter 20 and the wind speed of the blower 40 based on the request signal (Demand) provided from the indoor temperature regulator 10 and the air temperature (Return Air Temperature) provided from the heat exchanger 30.

More specifically, the conversion controller 50 may create the control information (Control) based on an air temperature (Return Air Temperature) at a time when the request signal (Demand) is disabled and an enabled section of the request signal (Demand), that is, the operating time of the state converter 20.

The temperature management device according to an embodiment of the present disclosure constructed as described above may be implemented as a warm air heater for increasing a temperature of the target zone, or may be implemented as an air conditioner for decreasing the temperature of the target zone.

FIGS. 2 to 5 may be diagrams for illustrating a configuration and operations of the warm air heater using the temperature management device according to an embodiment of the present disclosure.

In addition, FIGS. 6 to 9 may be diagrams for illustrating a configuration and operations of the air conditioner using the temperature management device according to an embodiment of the present disclosure.

Referring to FIGS. 2 to 5, the configuration and the operations of the warm air heater using the temperature management device according to an embodiment of the present disclosure will be described as follows.

Figure 2:
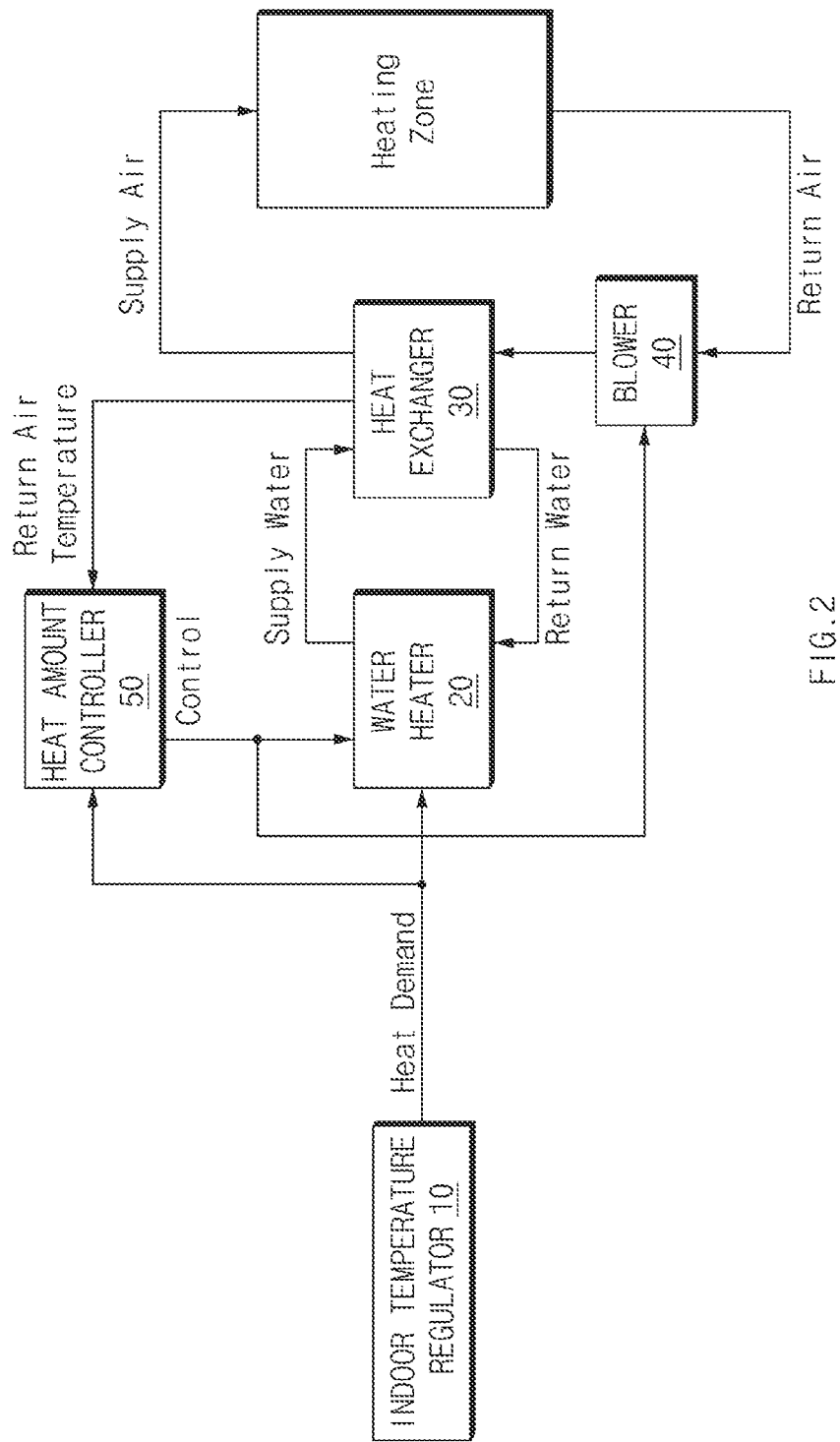
FIG. 2 is a diagram showing a configuration of a warm air heater using a temperature management device according to an embodiment of the present disclosure.

FIG. 2 is a diagram showing a configuration of a warm air heater using a temperature management device according to an embodiment of the present disclosure.

Referring to FIG. 2, the warm air heater using the temperature management device according to an embodiment of the present disclosure may include the indoor temperature regulator 10, the water heater 20, the heat exchanger 30, the blower 40, and the heat amount controller 50.

In this connection, the state converter 20 of FIG. 1 may be replaced with the water heater 20 of FIG. 2, and the water heater 20 may convert the state of the specific material, that is, a temperature of water, from a low temperature to a high temperature. In addition, the conversion controller 50 of FIG. 1 may be replaced with the heating controller 50 of FIG. 2.

The warm air heater using the temperature management device according to an embodiment of the present disclosure may supply heated air (Supply Air) to the interior (the heating zone), may receive cooled air (return air) from the interior (the heating zone), and may re-heat the received air and supply the heated air to the interior (the heating zone).

The indoor temperature regulator 10 may set the temperature of the interior (the heating zone) by the input of the user, and create a heating request signal (Heat Demand) by comparing the indoor temperature set by the user with the current indoor temperature.

For example, when the current indoor temperature is lower than the indoor temperature set by the user, the indoor temperature regulator 10 may create a heating request signal (Heat Demand) having the voltage level equal to or higher than the specific voltage level.

In one example, when the current indoor temperature is higher than the indoor temperature set by the user, the indoor temperature regulator 10 may create a heating request signal (Heat Demand) having the voltage level lower than the specific level.

In addition, the heating request signal (Heat Demand) created by the indoor temperature regulator 10 will be described as follows using the digital level as an example.

For example, the indoor temperature regulator 10 may create a heating request signal (Heat Demand) enabled to a high level when the current indoor temperature is lower than the indoor temperature set by the user.

In one example, the indoor temperature regulator 10 may create a heating request signal (Heat Demand) disabled to a low level when the current indoor temperature is higher than the indoor temperature set by the user.

In this connection, the heating request signal (Heat Demand) created from the indoor temperature regulator 10 may be provided to the water heater 20 and the heat amount controller 50.

The water heater 20 may receive cooled water (the specific material, Return Water) from the heat exchanger 30, heat the provided water, and provide heated water (Supply Water) to the heat exchanger 30.

In this connection, the water heater 20 may perform an operation of heating the cooled water and providing the heated water to the heat exchanger 30 when receiving the enabled heating request signal (Heat Demand) from the indoor temperature regulator 10, and may stop the water heating operation when the disabled heating request signal (Heat Demand) is provided.

In addition, the water heater 20 may vary a heat amount (a state conversion amount) at a time when heating the water based on control information (Control) provided from the heat amount controller 50.

For example, when heating the water with a high heat amount based on the control information (Control), the water heater 20 may provide water at a temperature higher than that in a case of heating the water with a low heat amount to the heat exchanger 30.

The heat exchanger 30 may increase the temperature of the air with the heated water provided from the water heater 20, supply the air whose temperature is increased to the interior (the heating zone), and return the water cooled after heating the air to the water heater 20.

In this connection, the heat exchanger 30 may heat the air (Return Air) provided from the blower 40, and sense the temperature of the air (Return Air) provided from the blower 40 and provide the sensed result (Return Air Temperature) to the heat amount controller 50.

The blower 40 may suck the air of the interior (the heating zone), and pass the sucked air through the heat exchanger to be introduced into the interior (the target zone).

In this connection, the blower 40 may receive the control information (Control) from the heat amount controller 50, may operate at the higher wind speed as the heat amount for heating the water of the water heater 20 increases, and may operate at the lower wind speed as the heat amount for heating the water of the water heater 20 decreases.

The heat amount controller 50 may create the control information (Control) based on an air temperature (Return Air Temperature) at a time when the water heater 20 stops the heating operation and an operating time of the water heater 20.

For example, the heat amount controller 50 may create the control information (Control) for controlling the heat amount of the water heater 20 and the wind speed of the blower 40 based on the heating request signal (Heat Demand) provided from the indoor temperature regulator 10 and the air temperature (Return Air Temperature) provided from the heat exchanger 30.

In a more detailed description, the heat amount controller 50 may create the control information (Control) based on an air temperature (Return Air Temperature) at a time when the heating request signal (Heat Demand) is disabled and an enabled section of the heating request signal (Heat Demand), that is, the operating time of the water heater 20.

Figure 3:
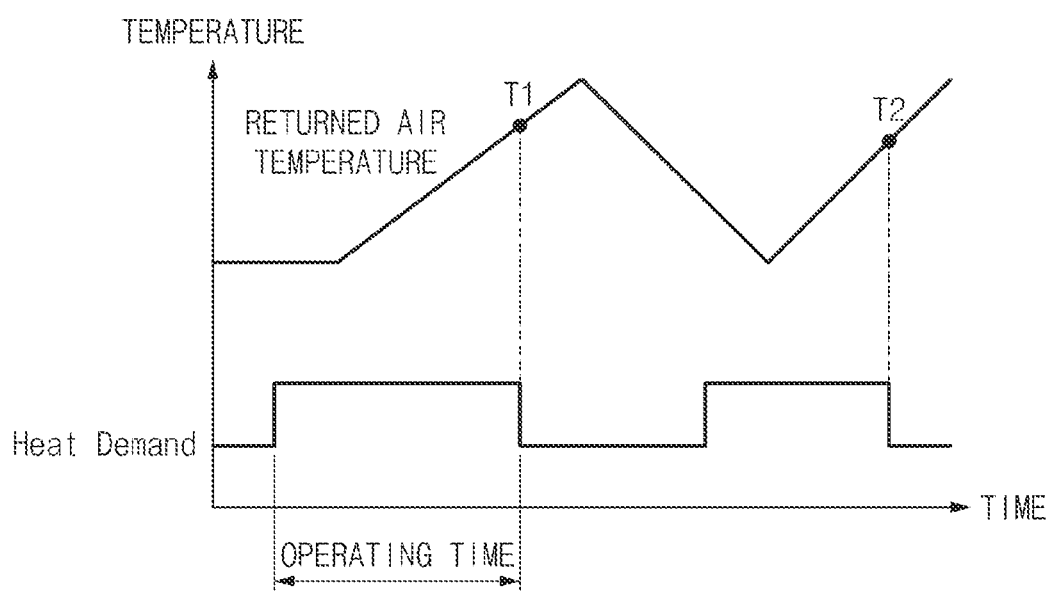
FIG. 3 is a diagram for illustrating an operation of a heat amount controller of FIG. 2.

FIG. 3 is a diagram for illustrating an operation of a heat amount controller of components of a warm air heater of FIG. 2.

Referring to FIG. 3, the operation of the heat amount controller 50 will be described in more detail as follows.

As described above, the heat amount controller 50 may create the control information (Control) based on the air temperature (Return Air Temperature) at the time when the water heater 20 stops the heating operation and the operating time of the water heater 20.

A time when the water heater 20 stops the heating operation may be a time when the heating request signal (Heat Demand) provided from the indoor temperature regulator 10 is disabled to the low level, and a time when the indoor temperature regulator 10 disables the heating request signal (Heat Demand) may be a time when the indoor temperature reaches the set indoor temperature.

Therefore, temperatures (Return Air Temperatures, T1 and T2) of the air (Return Air) introduced from the interior (the heating zone) at a time when the indoor temperature reaches the set indoor temperature may become a basis for estimating the set indoor temperature.

Therefore, the warm air heater using the temperature management device according to an embodiment of the present disclosure may estimate the indoor temperature (hereinafter, an indoor set temperature) set by the user based on the temperatures (Return Air Temperatures, T1 and T2) of the air introduced from the interior (the heating zone) at the time when the water heater stops the heating operation, that is, at the time when the heating request signal (Heat Demand) is disabled.

To implement the same, the heat amount controller 50 may store the air temperatures (Return Air Temperatures, T1 and T2) whenever the heating request signal (Heat Demand) is disabled, and may estimate an average value of the stored air temperatures T1 and T2 as the indoor temperature set by the user when the stored air temperatures are within an allowable error range.

When the temperature (Return Air Temperature) of the air introduced from the interior (the heating zone) is lower than the estimated indoor set temperature, the heat amount controller 50 may create control information (Control) for increasing the heat amount of the water heater 20 and increasing the wind speed of the blower 40.

In addition, when the temperature (Return Air Temperature) of the air introduced from the interior (the heating zone) is higher than the estimated indoor set temperature, the heat amount controller 50 may create control information (Control) for decreasing the heat amount of the water heater 20 and decreasing the wind speed of the blower 40.

A reason the operating time (or a heating time) of the water heater 20 increases may be grounds for a fact that the indoor temperature set by the user is high.

Therefore, it may be determined that the indoor set temperature is increased when the enabled section of the heating request signal (Heat Demand) (the operating time of the water heater 20) becomes greater than a preset section, and conversely, it may be determined that the indoor set temperature is decreased when the enabled section of the heating request signal (Heat Demand) (the operating time of the water heater 20) becomes smaller than the preset section.

Therefore, the heat amount controller 50 may increase the estimated indoor set temperature when an average value of the enabled sections of the heating request signal (Heat Demand) becomes greater than a value of the preset section.

In one example, the heat amount controller 50 may decrease the estimated indoor set temperature when the average value of the enabled sections of the heating request signal (Heat Demand) becomes smaller than the value of the preset section.

Figure 4:
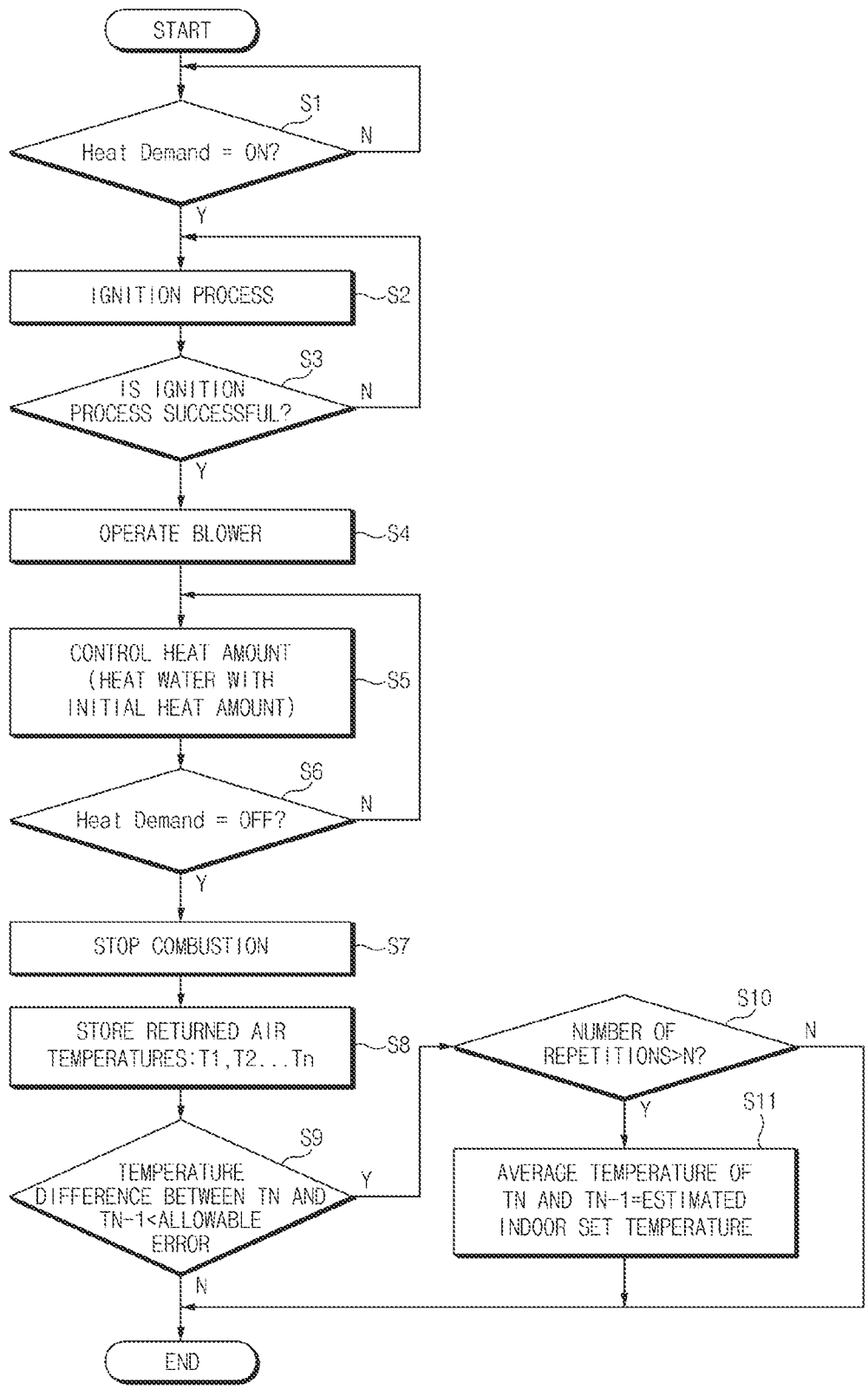
FIGS. 4 and 5 are diagrams illustrating flowcharts for illustrating operations of a warm air heater using a temperature management device according to an embodiment of the present disclosure.
Figure 5:
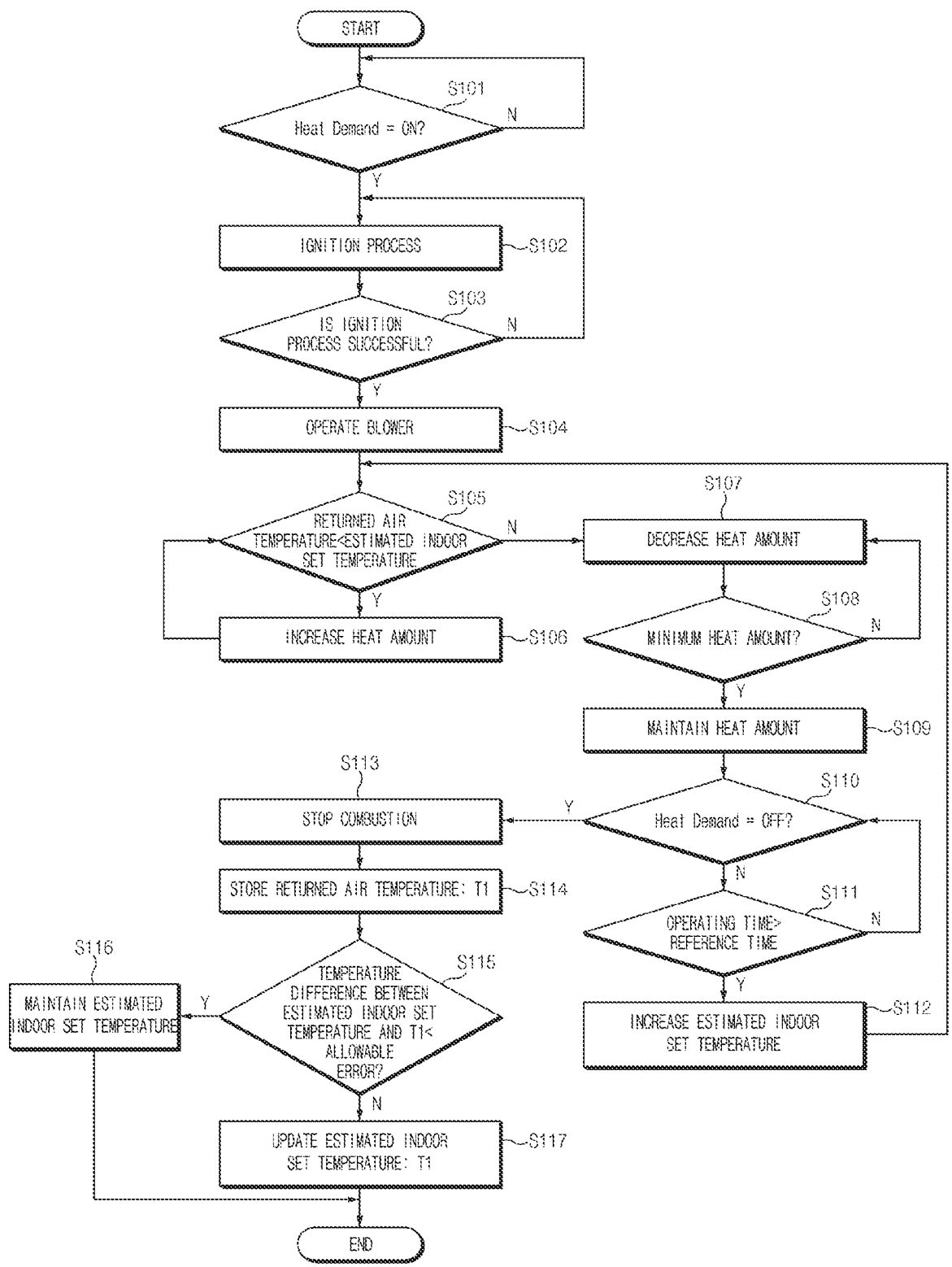

FIGS. 4 and 5 are diagrams illustrating flowcharts for illustrating operations of a warm air heater using a temperature management device according to an embodiment of the present disclosure.

FIG. 4 is a diagram for illustrating the operation of estimating the indoor set temperature set by the user by the warm air heater using the temperature management device according to an embodiment of the present disclosure.

The indoor temperature regulator 10 may create the heating request signal (Heat Demand) by comparing the indoor set temperature set by the user with the current indoor temperature.

For example, the indoor temperature regulator 10 may provide the enabled heating request signal (Heat Demand) to the water heater 20 and the heat amount controller 50 when the current indoor temperature is lower than the indoor set temperature set by the user.

In one example, the indoor temperature regulator 10 may provide the disabled heating request signal (Heat Demand) to the water heater 20 and the heat amount controller 50 when the current indoor temperature is higher than the indoor set temperature set by the user.

The water heater 20 may determine whether to proceed with an ignition process (S2) based on whether the heating request signal (Heat Demand) is enabled (S1).

For example, the water heater 20 may proceed with the ignition process (S2) when the heating request signal (Heat Demand) is enabled (Y, Heat Demand ON).

In one example, the water heater 20 may not proceed with the ignition process until the heating request signal (Heat Demand) is enabled when the heating request signal (Heat Demand) is not enabled, that is, maintains the disabled state (N).

Depending on whether the ignition process (S2) of the water heater 20 is successful, whether to operate the blower 40 may be determined (S3).

For example, when the ignition process (S2) of the water heater 20 is successful (Y), the blower 40 may be operated (S4).

In one example, when the ignition process (S2) of the water heater 20 is not successful (N), the water heater 20 may repeatedly proceed with the ignition process (S2) until the ignition process (S2) is successful.

After the blower 40 is operated, the water heater 20 may heat the water with a set initial heat amount, and provide the heated water to the heat exchanger 30 (S5).

The water heater 20 may heat the water until the enabled heating request signal (Heat Demand) is disabled (Heat Demand OFF), and provide the heated water to the heat exchanger 30 (S6).

For example, the water heater 20 may heat the water in the state in which the heating request signal (Heat Demand) is enabled (Heat Demand ON), and provide the heated water to the heat exchanger 30.

However, when the heating request signal (Heat Demand) is disabled (Heat Demand OFF), the water heater 20 may stop combustion (S7).

In this connection, the heat amount controller 50 may store the air temperature (Return Air Temperature) provided from the heat exchanger 30 when the heating request signal (Heat Demand) is disabled.

That is, the heat amount controller 50 may store air temperatures (Return Air Temperatures, T1, T2, . . . , Tn) stored while the operations from S1 to S7 are repeated.

The heat amount controller 50 may determine whether the stored air temperatures (Return Air Temperatures, T1, T2, . . . , Tn) are within the allowable error range (Tn−Tn−1<allowable error) (S9).

When the stored air temperatures (Return Air Temperatures, T1, T2, . . . , Tn) are within the allowable error range (Y), whether the water heater 20 has repeatedly operated and stopped more than a preset number of times (n) (the number of repetitions >n) may be determined (S10).

When the operation and the stop of the water heater 20 are repeated more than the preset number of times (n), the heat amount controller 50 may calculate an average value of the stored air temperatures (Return Air Temperatures, T1, T2, . . . , Tn), and create the calculated average value as a virtual indoor set temperature, that is, the estimated indoor set temperature.

An operation of the warm air heater using the temperature management device according to an embodiment of the present disclosure after the heat amount controller 50 estimates the indoor set temperature will be described with reference to FIG. 5 as follows.

The indoor temperature regulator 10 may create the heating request signal (Heat Demand) by comparing the indoor set temperature set by the user with the current indoor temperature.

For example, the indoor temperature regulator 10 may provide the enabled heating request signal (Heat Demand) to the water heater 20 and the heat amount controller 50 when the current indoor temperature is lower than the indoor set temperature set by the user.

In one example, the indoor temperature regulator 10 may provide the disabled heating request signal (Heat Demand) to the water heater 20 and the heat amount controller 50 when the current indoor temperature is higher than the indoor set temperature set by the user.

The water heater 20 may determine whether to proceed with an ignition process (S102) based on whether the heating request signal (Heat Demand) is enabled (S101).

For example, when the heating request signal (Heat Demand) is enabled (Y, Heat Demand ON), the water heater 20 may proceed with the ignition process (S102).

In one example, when the heating request signal (Heat Demand) is not enabled, that is, maintains the disabled state (N), the water heater 20 may not proceed with the ignition process until the heating request signal (Heat Demand) is enabled.

Whether to operate the blower 40 may be determined depending on whether the ignition process (S102) of the water heater 20 is successful (S103).

For example, when the ignition process (S102) of the water heater 20 is successful (Y), the blower 40 may be operated (S104).

In one example, when the ignition process (S102) of the water heater 20 is not successful (N), the water heater 20 may repeatedly proceed with the ignition process (S102) until the ignition process (S102) is successful.

The heat amount controller 50 may compare the temperature (Return Air Temperature) of the air (Return Air) introduced from the interior (the heating zone) with the estimated indoor set temperature (S105), and control the heat amount of the water heater 20 and the wind speed of the blower 40.

When the temperature (Return Air Temperature) of the air introduced from the interior (the heating zone) is lower than the estimated indoor set temperature (Y), the heat amount controller 50 may create control information (Control) for increasing the heat amount of the water heater 20 and increasing the wind speed of the blower 40 (S106).

The heat amount controller 50 may create the control information (Control) for increasing the heat amount of the water heater 20 and increasing the wind speed of the blower 40 until the temperature (Return Air Temperature) of the air introduced from the interior (the heating zone) becomes higher than the estimated indoor set temperature.

When the temperature (Return Air Temperature) of the air introduced from the interior (the heating zone) becomes higher than the estimated indoor set temperature (S105, N), the heat amount controller 50 may create control information (Control) for decreasing the heat amount of the water heater 20 and decreasing the wind speed of the blower 40 (S107).

In this connection, when the state (S105, N) in which the temperature (Return Air Temperature) of the air introduced from the interior (the heating zone) became higher than the estimated indoor set temperature is maintained, the heat amount controller 50 may decrease the heat amount of the water heater 20 to a minimum heat amount of the water heater 20 (S108).

The water heater 20 whose heat amount is decreased to the minimum heat amount may maintain the minimum heat amount (S109). In this connection, the blower 40 may also be operated at a minimum wind speed.

After the heat amount of the water heater 20 is decreased to the minimum heat amount, the heat amount controller 50 may determine whether the heating request signal (Heat Demand) is disabled (Heat Demand OFF?) (S110).

When the heating request signal (Heat Demand) is in the enabled state (N), the heat amount controller 50 may determine whether the enabled section of the heating request signal (Heat Demand) is greater than the preset section, that is, may continuously determine whether the operating time (the heating time) of the water heater 20 exceeds a reference time (S111).

When the operating time of the water heater 20 exceeds the reference time, the heat amount controller 50 may increase the estimated indoor set temperature (S112).

The heat amount controller 50 may perform the operation (S105) of comparing the increased estimated indoor set temperature with the temperature (Return Air Temperature) of the air introduced from the interior (the heating zone) again to control the heat amount of the water heater 20 again.

In one example, when the heating request signal (Heat Demand) is disabled in S110 (Y), the combustion of the water heater 20 may be stopped (S113).

When the combustion of the water heater 20 is stopped, the temperature (Return Air Temperature) of the air introduced from the interior (the heating zone) may be stored (S114).

Thereafter, the heat amount controller 50 may compare the estimated indoor set temperature with the stored air temperature (Return Air Temperature) (S115).

When a difference between the estimated indoor set temperature and the stored air temperature (Return Air Temperature) exceeds the allowable error range (N), the heat amount controller 50 may update and store the estimated indoor set temperature.

In one example, when the difference between the estimated indoor set temperature and the stored air temperature (Return Air Temperature) is within the allowable error range (Y), the heat amount controller 50 may maintain the estimated indoor set temperature.

The warm air heater using the temperature management device according to an embodiment of the present disclosure constructed and operated as described above may provide the heated air to a place to be heated (the interior, the heating zone), and estimate the indoor set temperature set by the user by monitoring the temperature (Return Air Temperature) of the air (Return Air) that is returned again.

In this connection, because the warm air heater using the temperature management device according to an embodiment of the present disclosure estimates the indoor set temperature using the temperature of the air that is returned, the estimated indoor set temperature may be lower than the indoor set temperature set by the user.

The warm air heater using the temperature management device according to an embodiment of the present disclosure may compare the estimated indoor set temperature with the temperature of the air that is returned, and operate such that the indoor temperature may be quickly increased by increasing the heat amount of the water heater 20 and increasing a wind volume of the blower when the estimated indoor set temperature is lower than the temperature of the air that is returned.

In addition, the warm air heater using the temperature management device according to an embodiment of the present disclosure may continuously decrease the heat amount of the water heater 20 to the minimum heat amount and decrease the wind volume of the blower 40 when the estimated indoor set temperature becomes higher than the temperature of the air that is returned. In this connection, an increase in the indoor temperature may be reduced.

Thereafter, when the actual indoor temperature becomes higher than the indoor set temperature set by the user, the indoor temperature regulator 10 may disable the heating request signal (Heat Demand) to stop the operation of the water heater 20.

After all, the warm air heater using the temperature management device according to an embodiment of the present disclosure may decrease the heat amount of the water heater and a wind power of the blower as the temperature of the place to be heated reaches the indoor set temperature set by the user to decrease a width at which the indoor temperature becomes higher than the indoor set temperature, thereby increasing an energy efficiency, and reducing noise pollution caused by the blower.

In addition, the warm air heater using the temperature management device according to an embodiment of the present disclosure has been described as a component for providing the heated water to the heat exchanger using the water, but it should be noted that a material that may transfer a high temperature to the heat exchanger is not limited to the water.

Figure 6:
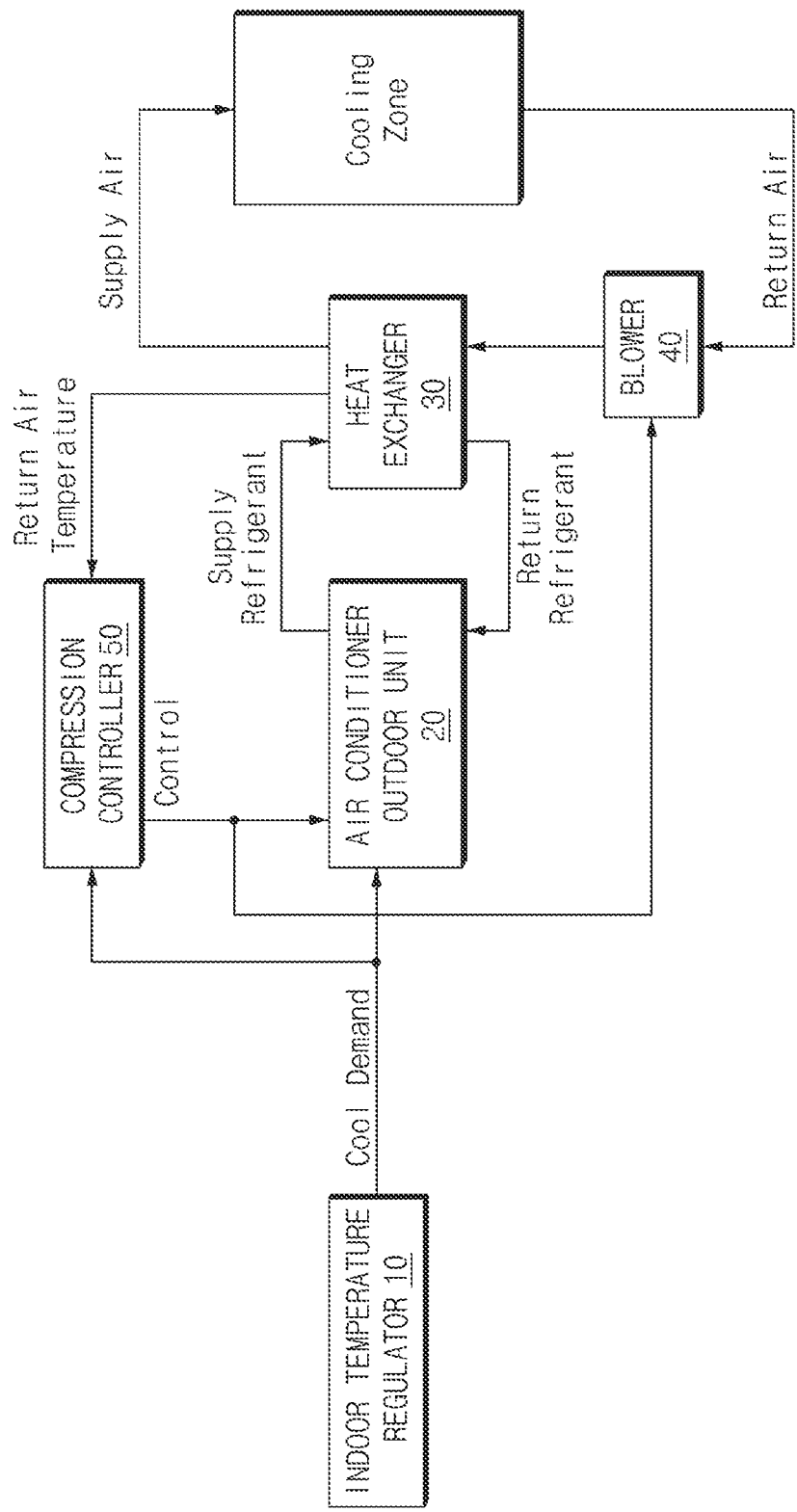
FIG. 6 is a diagram showing a configuration of an air conditioner using a temperature management device according to an embodiment of the present disclosure.

FIG. 6 is a diagram showing a configuration of an air conditioner using a temperature management device according to an embodiment of the present disclosure.

Referring to FIG. 6, the air conditioner using the temperature management device according to an embodiment of the present disclosure may include the indoor temperature regulator 10, the air conditioner outdoor unit 20, the heat exchanger 30, the blower 40, and the compression controller 50.

In this connection, the air conditioner outdoor unit 20 of FIG. 6 may correspond to the state converter 20 of FIG. 1, and the compression controller 50 of FIG. 6 may correspond to the conversion controller 50 of FIG. 1.

The air conditioner using the temperature management device according to an embodiment of the present disclosure may supply air with a low temperature (Supply Air) to an interior (a cooling zone), and decrease a temperature of air (return air) whose temperature has been increased, introduced from the interior (the cooling zone), and provide the air with the decreased temperature to the interior (the cooling zone) again.

The indoor temperature regulator 10 may set a temperature of the interior (the cooling zone) by the input of the user, and may create a cooling request signal (Cool Demand) by comparing the indoor temperature set by the user with the current indoor temperature.

For example, the indoor temperature regulator 10 may create a cooling request signal (Cool Demand) having a voltage level equal to or higher than the specific voltage level when the current indoor temperature is higher than the indoor temperature set by the user.

In one example, the indoor temperature regulator 10 may create a cooling request signal (Cool Demand) having a voltage level lower than the specific level when the current indoor temperature is lower than the indoor temperature set by the user.

When the cooling request signal (Cool Demand) created by the indoor temperature regulator 10 will be described as follows using the digital level as an example.

For example, the indoor temperature regulator 10 may create a cooling request signal (Cool Demand) enabled to a high level when the current indoor temperature is higher than the indoor temperature set by the user.

In one example, the indoor temperature regulator 10 may create a cooling request signal (Cool Demand) disabled to a low level when the current indoor temperature is lower than the indoor temperature set by the user.

In this connection, the cooling request signal (Cool Demand) created from the indoor temperature regulator 10 may be provided to the air conditioner outdoor unit 20 and the compression controller 50.

The air conditioner outdoor unit 20 may receive a refrigerant (the specific material) having a decreased pressure from the heat exchanger 30, and compress (convert a state of) the received refrigerant and provide the compressed refrigerant to the heat exchanger 30.

In this connection, the air conditioner outdoor unit 20 may perform the operation of compressing the refrigerant and providing the compressed refrigerant to the heat exchanger 30 when receiving the enabled cooling request signal (Cool Demand) from the indoor temperature regulator 10, and stop the compression operation of the refrigerant when receiving the disabled cooling request signal (Cool Demand).

In addition, the air conditioner outdoor unit 20 may vary a compression capacity (the state conversion amount) of the refrigerant (the specific material) based on control information (Control) provided from the compression controller 50.

For example, when compressing the refrigerant with a high compression capacity based on the control information (Control), the air conditioner outdoor unit 20 may provide a compressed refrigerant of an amount larger than that in a case of compressing the refrigerant with a low compression capacity.

The heat exchanger 30 may decrease the temperature of the air with the compressed refrigerant provided from the air conditioner outdoor unit 20, supply the air whose temperature is decreased to the interior (the cooling zone), and return the refrigerant whose pressure is decreased after decreasing the temperature of the air to the air conditioner outdoor unit 20.

In this connection, the heat exchanger 30 may decrease the temperature of the air (Return Air) provided from the blower 40, and sense the temperature of the air (Return Air) provided from the blower 40 and provide the sensed result (Return Air Temperature) to the compression controller 50.

The operations of the air conditioner outdoor unit 20 and the heat exchanger 30 will be described in more detail as follows.

The air conditioner outdoor unit 20 may be implemented as a compressor and a condenser, the compressor may compress a refrigerant in a gaseous state at a high temperature and a high pressure, and the condenser may release heat from the high-temperature and high-pressure refrigerant in the gaseous state to create a low-temperature and high-pressure refrigerant in a liquid state.

The heat exchanger 30 may be implemented as an expansion valve and an evaporator, the expansion valve may decrease a pressure of the low-temperature and high-pressure refrigerant in the liquid state to create a low-temperature and low-pressure refrigerant in the liquid state, and the evaporator may vaporize the low-temperature and low-pressure refrigerant in the liquid state to take heat from the air (Return Air) provided from the blower 40 and supply the cooled air (Supply Air) to the interior (the cooling zone).

The blower 40 may suck the air of the interior (the cooling zone), and pass the sucked air through the heat exchanger to be introduced into the interior (the cooling zone).

In this connection, the blower 40 may receive the control information (Control) from the compression controller 50, may operate at the higher wind speed as the refrigerant compression capacity of the air conditioner outdoor unit 20 increases, and may operate at the lower wind speed as the refrigerant compression capacity of the air conditioner outdoor unit 20 decreases.

The compression controller 50 may create the control information (Control) based on a temperature (Return Air Temperature) of the air at a time when the air conditioner outdoor unit 20 stops the compression operation and an operating time of the air conditioner outdoor unit 20.

For example, the compression controller 50 may create control information (Control) for controlling the compression capacity of the air conditioner outdoor unit 20 and the wind speed of the blower 40 based on the cooling request signal (Cool Demand) provided from the indoor temperature regulator 10 and the air temperature (Return Air Temperature) provided from the heat exchanger 30.

More specifically, the compression controller 50 may create the control information (Control) based on an air temperature (Return Air Temperature) at a time when the cooling request signal (Cool Demand) is disabled and an enabled section of the cooling request signal (Cool Demand), that is, the operating time of the air conditioner outdoor unit 20.

Figure 7:
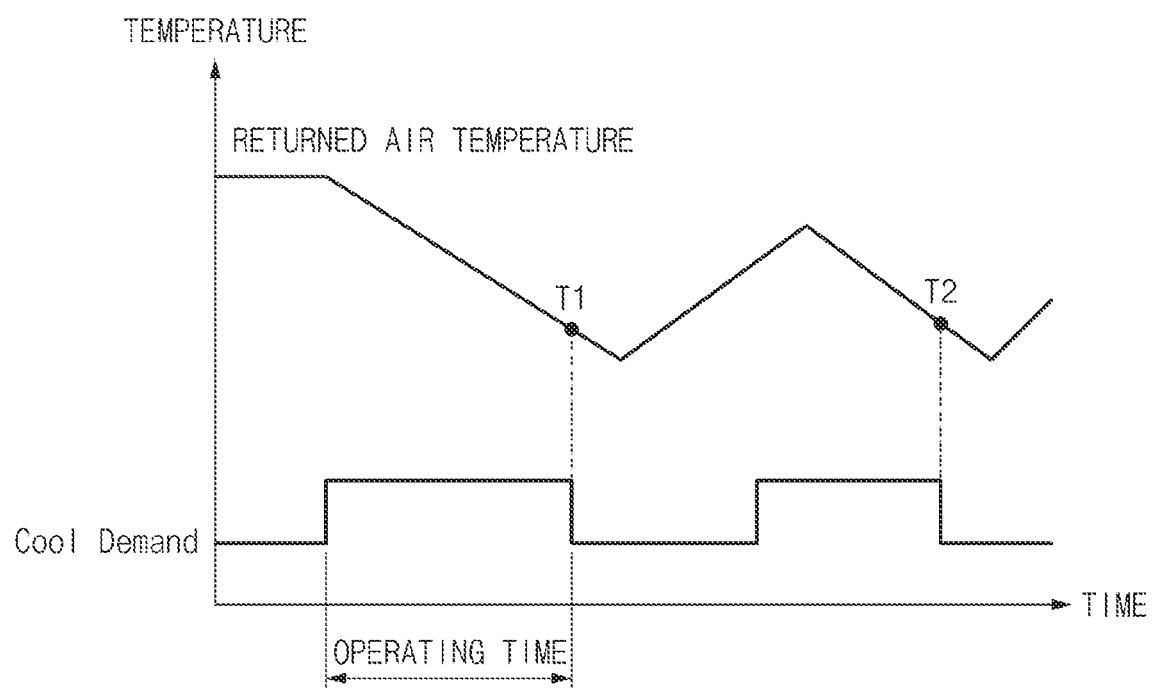
FIG. 7 is a diagram for illustrating an operation of a compression controller of FIG. 6.

FIG. 7 is a diagram for illustrating an operation of a compression controller of FIG. 6.

Referring to FIG. 7, the operation of the compression controller 50 will be described in more detail as follows.

As described above, the compression controller 50 may create the control information (Control) based on the air temperature (Return Air Temperature) at the time when the air conditioner outdoor unit 20 stops the compression operation and the operating time of the air conditioner outdoor unit 20.

A time when the air conditioner outdoor unit 20 stops the compression operation may be a time when the cooling request signal (Cool Demand) provided from the indoor temperature regulator 10 is disabled to the low level, and a time when the indoor temperature regulator 10 disables the cooling request signal (Cool Demand) may be a time when the indoor temperature reaches the set indoor temperature.

Therefore, temperatures (Return Air Temperatures, T1 and T2) of the air (Return Air) introduced from the interior (the cooling zone) at the time when the indoor temperature reaches the set indoor temperature may become the basis for estimating the set indoor temperature.

Therefore, the air conditioner according to an embodiment of the present disclosure may estimate the indoor temperature (hereinafter, the indoor set temperature) set by the user based on the temperatures (Return Air Temperatures, T1 and T2) of the air introduced from the interior (the cooling zone) at the time when the air conditioner outdoor unit 20 stops the compression operation, that is, at the time when the cooling request signal (Cool Demand) is disabled.

To implement the same, the compression controller 50 may store the air temperatures (Return Air Temperatures, T1 and T2) whenever the cooling request signal (Cool Demand) is disabled, and may estimate the average value of the stored air temperatures T1 and T2 as the indoor temperature set by the user when the stored air temperatures are within the allowable error range.

When the temperature (Return Air Temperature) of the air introduced from the interior (the cooling zone) is higher than the estimated indoor set temperature, the compression controller 50 may create control information (Control) for increasing the compression capacity of the air conditioner outdoor unit 20 and increasing the wind speed of the blower 40.

In addition, when the temperature (Return Air Temperature) of the air introduced from the interior (the cooling zone) is lower than the estimated indoor set temperature, the compression controller 50 may create control information (Control) for decreasing the compression capacity of the air conditioner outdoor unit 20 and decreasing the wind speed of the blower 40.

A reason the operating time (or a cooling time) of the air conditioner outdoor unit 20 increases may be grounds for a fact that the indoor temperature set by the user is low.

Therefore, it may be determined that the indoor set temperature is decreased when the enabled section of the cooling request signal (Cool Demand) (the operating time of the air conditioner outdoor unit 20) becomes greater than the preset section, and conversely, it may be determined that the indoor set temperature is increased when the enabled section of the cooling request signal (Cool Demand) (the operating time of the air conditioner outdoor unit 20) becomes smaller than the preset section.

Therefore, the compression controller 50 may decrease the estimated indoor set temperature when an average value of the enabled sections of the cooling request signal (Cool Demand) becomes greater than the value of the preset section.

In one example, the compression controller 50 may increase the estimated indoor set temperature when the average value of the enabled sections of the cooling request signal (Cool Demand) becomes smaller than the value of the preset section.

Figure 8:
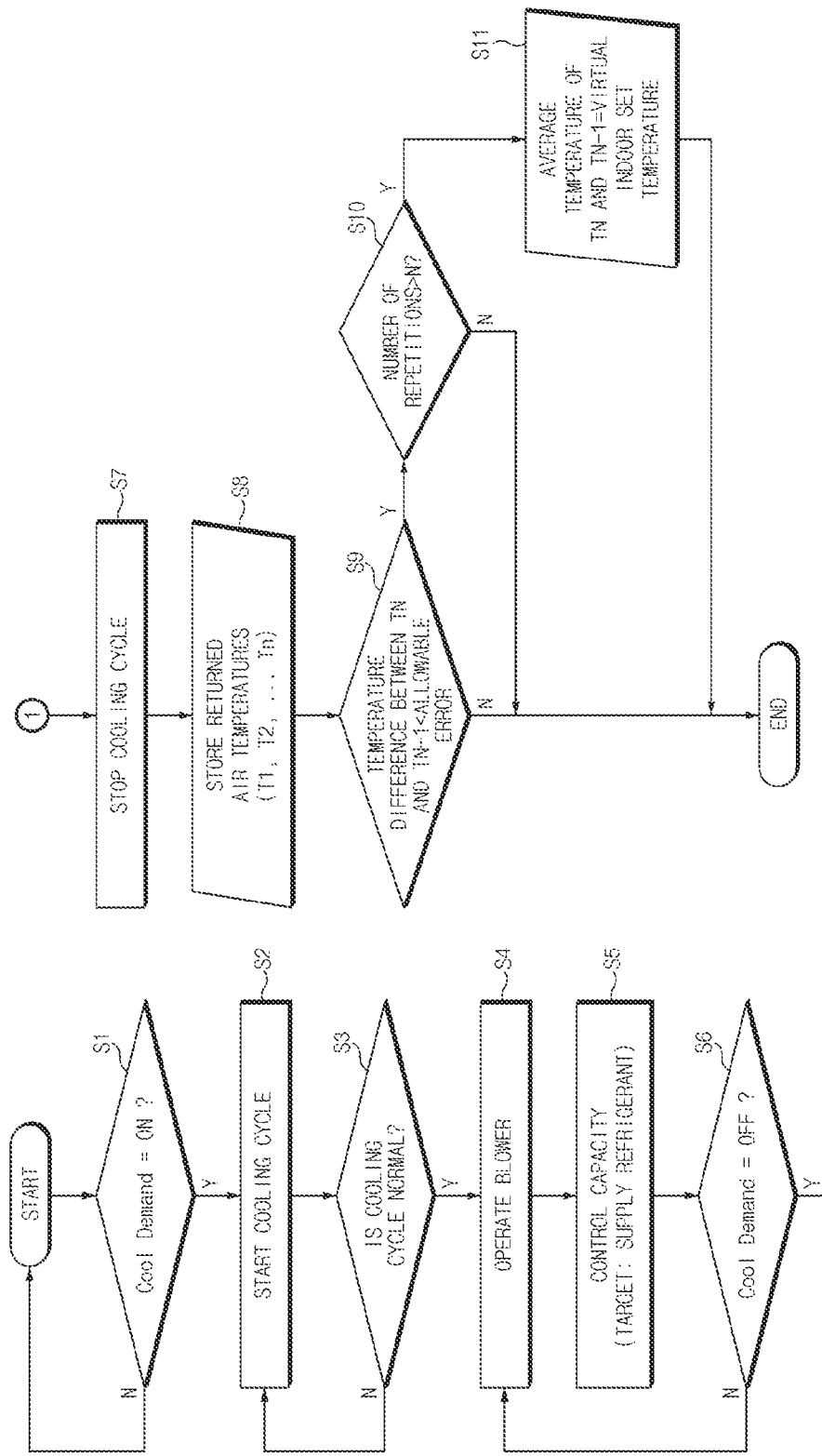
FIGS. 8 and 9 are diagrams illustrating flowcharts for illustrating operations of an air conditioner using a temperature management device according to an embodiment of the present disclosure.
Figure 9:
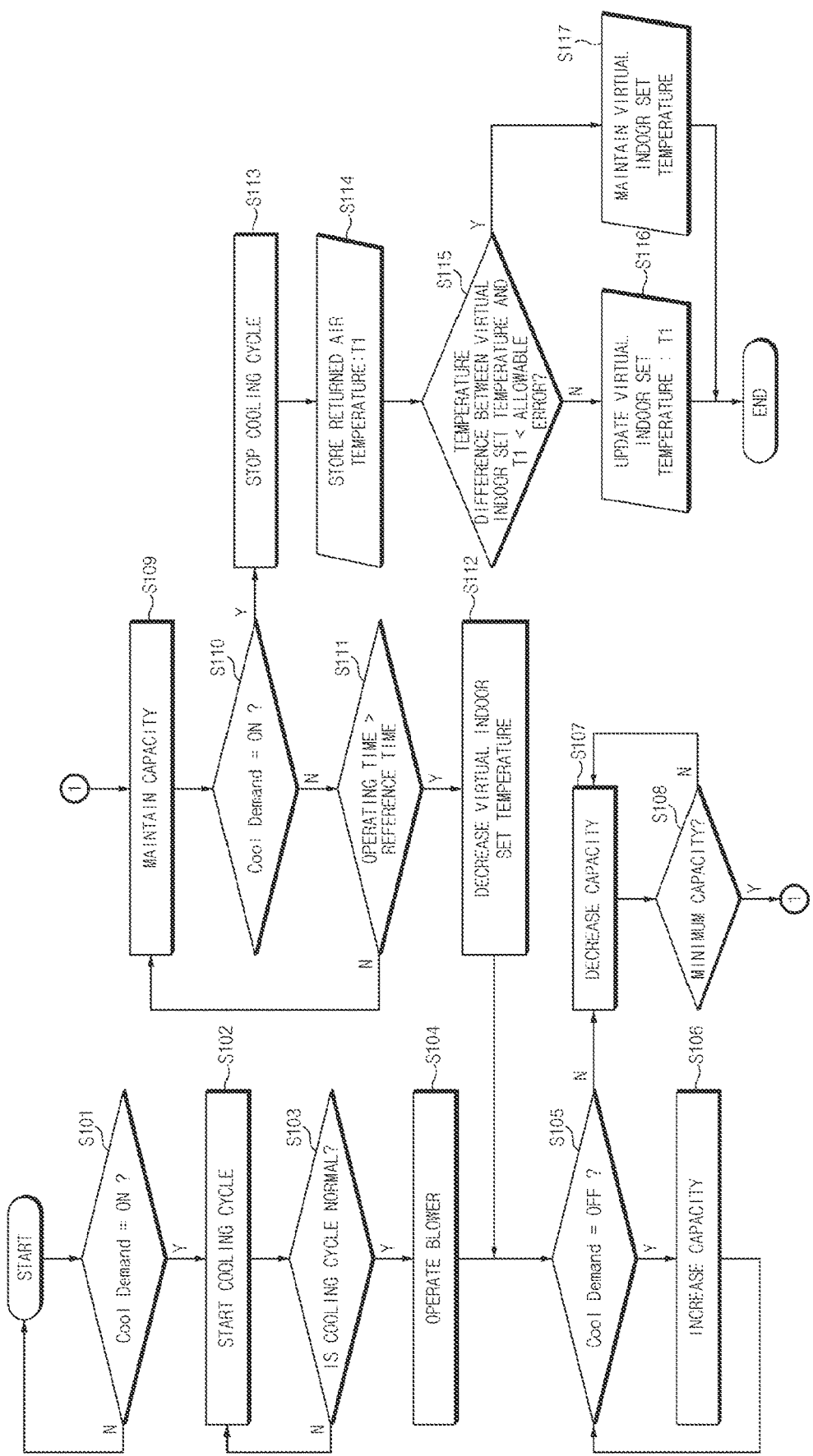

FIGS. 8 and 9 are diagrams illustrating flowcharts for illustrating operations of an air conditioner using a temperature management device according to an embodiment of the present disclosure.

FIG. 8 is a diagram for illustrating the operation of estimating the indoor set temperature set by the user by the air conditioner using the temperature management device according to an embodiment of the present disclosure.

The indoor temperature regulator 10 may create the cooling request signal (Cool Demand) by comparing the indoor set temperature set by the user with the current indoor temperature.

For example, the indoor temperature regulator 10 may provide the enabled cooling request signal (Cool Demand) to the air conditioner outdoor unit 20 and the compression controller 50 when the current indoor temperature is higher than the indoor set temperature set by the user.

In one example, the indoor temperature regulator 10 may provide the disabled cooling request signal (Cool Demand) to the air conditioner outdoor unit 20 and the compression controller 50 when the current indoor temperature is lower than the indoor set temperature set by the user.

The air conditioner outdoor unit 20 may determine whether to proceed with a cooling cycle (S2) based on whether the cooling request signal (Cool Demand) is enabled (S1). In this connection, the cooling cycle may mean refrigerant circulation between the air conditioner outdoor unit 20 and the heat exchanger 30.

For example, the air conditioner outdoor unit 20 may proceed with the cooling cycle (S2) when the cooling request signal (Cool Demand) is enabled (Y, Cool Demand ON).

In one example, the air conditioner outdoor unit 20 may not proceed with the cooling cycle until the cooling request signal (Cool Demand) is enabled when the cooling request signal (Cool Demand) is not enabled, that is, maintains the disabled state (N).

Depending on whether the refrigerant is normally circulated between the air conditioner outdoor unit 20 and the heat exchanger 30, that is, whether the cooling cycle is normal (S2), whether to operate the blower 40 may be determined (S3).

For example, when the cooling cycle is normal (Y), the blower 40 may be operated (S4).

In one example, when the cooling cycle is not normal (N), the cooling cycle may be repeatedly performed until the refrigerant is normally circulated between the air conditioner outdoor unit 20 and the heat exchanger 30.

After the blower 40 is operated, the air conditioner outdoor unit 20 may compress the refrigerant with a set initial compression capacity, and provide the compressed refrigerant to the heat exchanger 30 (S5).

The air conditioner outdoor unit 20 may compress the refrigerant until the enabled cooling request signal (Cool Demand) is disabled (Cool Demand OFF), and provide the compressed refrigerant to the heat exchanger 30 (S6).

For example, the air conditioner outdoor unit 20 may compress the refrigerant in the state in which the cooling request signal (Cool Demand) is enabled (Cool Demand ON), and provide the compressed refrigerant to the heat exchanger 30.

However, when the cooling request signal (Cool Demand) is disabled (Cool Demand OFF), the air conditioner outdoor unit may stop the compression operation (S7).

In this connection, the compression controller 50 may store the air temperature (Return Air Temperature) provided from the heat exchanger 30 when the cooling request signal (Cool Demand) is disabled.

That is, the compression controller 50 may store air temperatures (Return Air Temperatures, $T1, T2, \ldots, Tn$) stored while operations from S1 to S7 are repeated.

The compression controller 50 may determine whether the stored air temperatures (Return Air Temperatures, $T1, T2, \ldots, Tn$) are within the allowable error range ($Tn-Tn-1 <$ allowable error) (S9).

When the stored air temperatures (Return Air Temperatures, $T1, T2, \ldots, Tn$) are within the allowable error range (Y), whether the air conditioner outdoor unit 20 has repeatedly operated (the compression operation) and stopped more than the preset number of times (n) (the number of repetitions $>n$) may be determined (S10).

When the operation and the stop of the air conditioner outdoor unit 20 are repeated more than the preset number of times (n), the compression controller 50 may calculate the average value of the stored air temperatures (Return Air Temperatures, $T1, T2, \ldots, Tn$), and create the calculated average value as the virtual indoor set temperature, that is, the estimated indoor set temperature.

An operation of the air conditioner using the temperature management device according to an embodiment of the present disclosure after the compression controller 50 estimates the indoor set temperature will be described with reference to FIG. 9 as follows.

The indoor temperature regulator 10 may create the cooling request signal (Cool Demand) by comparing the indoor set temperature set by the user with the current indoor temperature.

For example, the indoor temperature regulator 10 may provide the enabled cooling request signal (Cool Demand) to the air conditioner outdoor unit 20 and the compression controller 50 when the current indoor temperature is higher than the indoor set temperature set by the user.

In one example, the indoor temperature regulator 10 may provide the disabled cooling request signal (Cool Demand) to the air conditioner outdoor unit 20 and the compression controller 50 when the current indoor temperature is lower than the indoor set temperature set by the user.

The air conditioner outdoor unit 20 may determine whether to proceed with a cooling cycle (S102) based on whether the cooling request signal (Cool Demand) is enabled (S101).

For example, when the cooling request signal (Cool Demand) is enabled (Y, Cool Demand ON), the air conditioner outdoor unit may proceed with the cooling cycle (S102).

In one example, when the cooling request signal (Cool Demand) is not enabled, that is, maintains the disabled state (N), the air conditioner outdoor unit 20 may not proceed with the cooling cycle until the cooling request signal (Cool Demand) is enabled.

Whether to operate the blower 40 may be determined depending on whether the cooling cycle (S102) between the air conditioner outdoor unit 20 and the heat exchanger 30 is performed normally (S103).

For example, when the cooling cycle (S102) between the air conditioner outdoor unit 20 and the heat exchanger 30 is performed normally (Y), the blower 40 may be operated (S104).

In one example, when the cooling cycle (S102) between the air conditioner outdoor unit 20 and the heat exchanger 30 is not performed normally (N), the air conditioner outdoor unit 20 may repeatedly proceed with the cooling cycle (S102) until the cooling cycle (S102) is performed normally.

The compression controller 50 may compare the temperature (Return Air Temperature) of the air (Return Air) introduced from the interior (the cooling zone) with the estimated indoor set temperature (S105), and control the compression capacity of the air conditioner outdoor unit 20 and the wind speed of the blower 40.

When the temperature (Return Air Temperature) of the air introduced from the interior (the cooling zone) is higher than the estimated indoor set temperature (Y), the compression controller 50 may create control information (Control) for increasing the compression capacity of the air conditioner outdoor unit 20 and increasing the wind speed of the blower 40 (S106).

That is, the compression controller 50 may create the control information (Control) for increasing the compression capacity of the air conditioner outdoor unit 20 and increasing the wind speed of the blower 40 until the temperature (Return Air Temperature) of the air introduced from the interior (the cooling zone) becomes higher than the estimated indoor set temperature.

When the temperature (Return Air Temperature) of the air introduced from the interior (the cooling zone) becomes lower than the estimated indoor set temperature (S105, N), the compression controller 50 may create control information (Control) for decreasing the compression capacity of the air conditioner outdoor unit 20 and decreasing the wind speed of the blower 40 (S107).

In this connection, when the state (S105, N) in which the temperature (Return Air Temperature) of the air introduced from the interior (the cooling zone) became lower than the estimated indoor set temperature is maintained, the compression controller 50 may decrease the compression capacity of the air conditioner outdoor unit 20 to a minimum compression capacity of the air conditioner outdoor unit 20 (S108).

The air conditioner outdoor unit 20 whose compression capacity is decreased to the minimum compression capacity may maintain the minimum compression capacity (S109). In this connection, the blower 40 may also be operated at a minimum wind speed.

After the compression capacity of the air conditioner outdoor unit 20 is decreased to the minimum compression capacity, the compression controller 50 may determine whether the cooling request signal (Cool Demand) is disabled (Cool Demand OFF?) (S110).

When the cooling request signal (Cool Demand) is in the enabled state (N), the compression controller 50 may determine whether the enabled section of the cooling request signal (Cool Demand) is greater than the preset section, that is, may continuously determine whether the operating time of the air conditioner outdoor unit 20 exceeds the reference time (S111).

When the operating time of the air conditioner outdoor unit 20 exceeds the reference time, the compression controller 50 may decrease the estimated indoor set temperature (S112).

The heat amount controller 50 may perform the operation (S105) of comparing the decreased estimated indoor set temperature with the temperature (Return Air Temperature) of the air introduced from the interior (the cooling zone) again to vary the compression capacity of the air conditioner outdoor unit 20 again.

In one example, when the cooling request signal (Cool Demand) is disabled in S110 (Y), the operation of the air conditioner outdoor unit 20 may be stopped (S113).

When the operation of the air conditioner outdoor unit is stopped, the temperature (Return Air Temperature) of the air introduced from the interior (the cooling zone) may be stored (S114).

Thereafter, the compression controller 50 may compare the estimated indoor set temperature with the stored air temperature (Return Air Temperature) (S115).

When the difference between the estimated indoor set temperature and the stored air temperature (Return Air Temperature) exceeds the allowable error range (N), the compression controller 50 may update and store the estimated indoor set temperature.

In one example, when the difference between the estimated indoor set temperature and the stored air temperature (Return Air Temperature) is within the allowable error range (Y), the compression controller 50 may maintain the estimated indoor set temperature.

The air conditioner according to an embodiment of the present disclosure constructed and operated as described above may provide air of a low temperature to a place to be cooled (the interior, the cooling zone), and estimate the indoor set temperature set by the user by monitoring the temperature (Return Air Temperature) of the air (Return Air) that is returned again.

In this connection, because the air conditioner according to an embodiment of the present disclosure estimates the indoor set temperature using the temperature of the air that is returned, the estimated indoor set temperature may be higher than the indoor set temperature set by the user.

The air conditioner according to an embodiment of the present disclosure may compare the estimated indoor set temperature with the temperature of the air that is returned, and operate such that the indoor temperature may be quickly decreased by increasing the compression capacity of the air conditioner outdoor unit 20 and increasing the wind volume of the blower 40 when the estimated indoor set temperature is higher than the temperature of the air that is returned.

In addition, the air conditioner according to an embodiment of the present disclosure may continuously decrease the compression capacity of the air conditioner outdoor unit 20 to the minimum compression capacity and decrease the wind volume of the blower 40 when the estimated indoor set temperature becomes lower than the temperature of the air that is returned. In this connection, a decrease in the indoor temperature may be decreased.

Thereafter, when the actual indoor temperature becomes lower than the indoor set temperature set by the user, the indoor temperature regulator 10 may disable the cooling request signal (Cool Demand) to stop the operation of the air conditioner outdoor unit 20.

After all, the air conditioner according to an embodiment of the present disclosure may decrease the compression capacity of the air conditioner outdoor unit and the wind power of the blower as the temperature of the place to be cooled reaches the indoor set temperature set by the user to decrease a width at which the indoor temperature becomes lower than the indoor set temperature, thereby increasing the energy efficiency, and reducing the noise pollution caused by the blower.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

The present technology has an advantage of estimating the indoor temperature set by the user to reduce the difference between the set indoor temperature and a sensible temperature, increase heating and cooling efficiency, and reduce the noise.

In addition, various effects directly or indirectly identified through this document may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for managing a temperature, the device comprising:
    a conversion controller including a heat amount controller and configured to:
        estimate an indoor set temperature based on a temperature of air returned from a target zone and an operating time of a state converter, the state converter including a heater; and
        control a state conversion amount of the state converter by comparing the estimated indoor set temperature with the temperature of the returned air; and
    a heat exchanger for varying the temperature of the returned air and providing the air whose temperature is varied to the target zone;
    wherein the state conversion amount includes a heat amount;
    wherein the heater heats water with the heat amount resulted from control of the heat amount controller and provides the heated water to the heat exchanger;
    wherein the heat amount controller is configured to:
        decrease the heat amount of the heater to a minimum heat amount of the heater when the temperature of the returned air is higher than the estimated indoor set temperature to reduce the heat amount of the heater; and
        control the heater to heat the water with the minimum heat amount until the heater stops operating.

2. The device of claim 1, wherein the state converter converts a state of a specific material with the state conversion amount resulted from the control of the conversion controller, and provides the converted specific material to the heat exchanger.

3. The device of claim 2, wherein, when the heat exchanger increases the temperature of the returned air and provides the air whose temperature is increased to the target zone, the conversion controller is configured to:
    heat the specific material by increasing the state conversion amount of the state converter when the temperature of the returned air is lower than the estimated indoor set temperature; and
    heat the specific material by decreasing the state conversion amount of the state converter when the temperature of the returned air is higher than the estimated indoor set temperature.

4. The device of claim 2, wherein, when the heat exchanger decreases the temperature of the returned air and provides the air whose temperature is decreased to the target zone, the conversion controller is configured to:
    increase a pressure of the specific material by increasing the state conversion amount of the state converter when the temperature of the returned air is higher than the estimated indoor set temperature; and
    decrease the pressure of the specific material by decreasing the state conversion amount of the state converter when the temperature of the returned air is lower than the estimated indoor set temperature.

5. The device of claim 1, wherein the conversion controller is configured to:
    store the temperature of the returned air when the state converter stops operating; and
    estimate an average of stored air temperatures within an allowable error range as the estimated indoor set temperature.

6. The device of claim 1, wherein the heat amount controller is configured to:
    increase the heat amount of the heater when the temperature of the returned air is lower than the estimated indoor set temperature.

7. The device of claim 6, further comprising:
    a blower for transferring the heated air to the target zone and retrieving the air from the target zone,
    wherein a wind volume of the blower is increased when the temperature of the returned air is lower than the estimated indoor set temperature,
    wherein the wind volume of the blower is decreased when the temperature of the returned air is higher than the estimated indoor set temperature.

8. The device of claim 1, wherein the heat amount controller is configured to:
    store the temperature of the returned air when the heater stops operating; and
    estimate an average of stored air temperatures within an allowable error range as the estimated indoor set temperature.

9. The device of claim 8, wherein the heat amount controller is configured to increase the estimated indoor set temperature when an operating time of the heater increases to be greater than a reference time.

10. The device of claim 1, wherein the heat amount controller is configured to:
   update the estimated indoor set temperature when the estimated indoor set temperature exceeds an allowable error range; and
   maintain the estimated indoor set temperature when the estimated indoor set temperature is within the allowable error range.

11. The device of claim 1, wherein the state converter includes an air conditioner outdoor unit,
   wherein the conversion controller includes a compression controller,
   wherein the state conversion amount includes a compression capacity,
   wherein the air conditioner outdoor unit is constructed to compress a refrigerant with the compression capacity resulted from control of the compression controller and provide the compressed refrigerant to the heat exchanger.

12. The device of claim 11, wherein the compression controller is configured to:
   increase the compression capacity of the air conditioner outdoor unit when the temperature of the returned air is higher than the estimated indoor set temperature; and
   decrease the compression capacity of the air conditioner outdoor unit when the temperature of the returned air is lower than the estimated indoor set temperature.

13. The device of claim 12, wherein the compression controller is configured to:
   decrease the compression capacity of the air conditioner outdoor unit to a minimum compression capacity of the air conditioner outdoor unit when the temperature of the returned air is lower than the estimated indoor set temperature to reduce the compression capacity of the air conditioner outdoor unit; and
   control the air conditioner outdoor unit to compress the refrigerant with the minimum compression amount until the air conditioner outdoor unit stops operating.

14. The device of claim 12, further comprising:
   a blower for transferring the air cooled by the heat exchanger to the target zone and retrieving the air from the target zone,
   wherein the blower is constructed to increase a wind volume when the temperature of the returned air is higher than the estimated indoor set temperature,
   wherein the blower is constructed to decrease the wind volume when the temperature of the returned air is lower than the estimated indoor set temperature.

15. The device of claim 11, wherein the compression controller is configured to:
   store the temperature of the returned air when the air conditioner outdoor unit stops operating; and
   estimate an average of stored air temperatures within an allowable error range as the estimated indoor set temperature.

16. The device of claim 15, wherein the compression controller is configured to decrease the estimated indoor set temperature when an operating time of the air conditioner outdoor unit increases to be greater than a reference time.

17. The device of claim 11, wherein the compression controller is configured to:
   update the estimated indoor set temperature when the estimated indoor set temperature exceeds an allowable error range; and
   maintain the estimated indoor set temperature when the estimated indoor set temperature is within the allowable error range.

* * * * *